Oct. 12, 1926.  
A. F. MULLER  
1,603,140  
APPARATUS FOR MAKING CORK ARTICLES  
Filed July 30, 1925   4 Sheets-Sheet 2
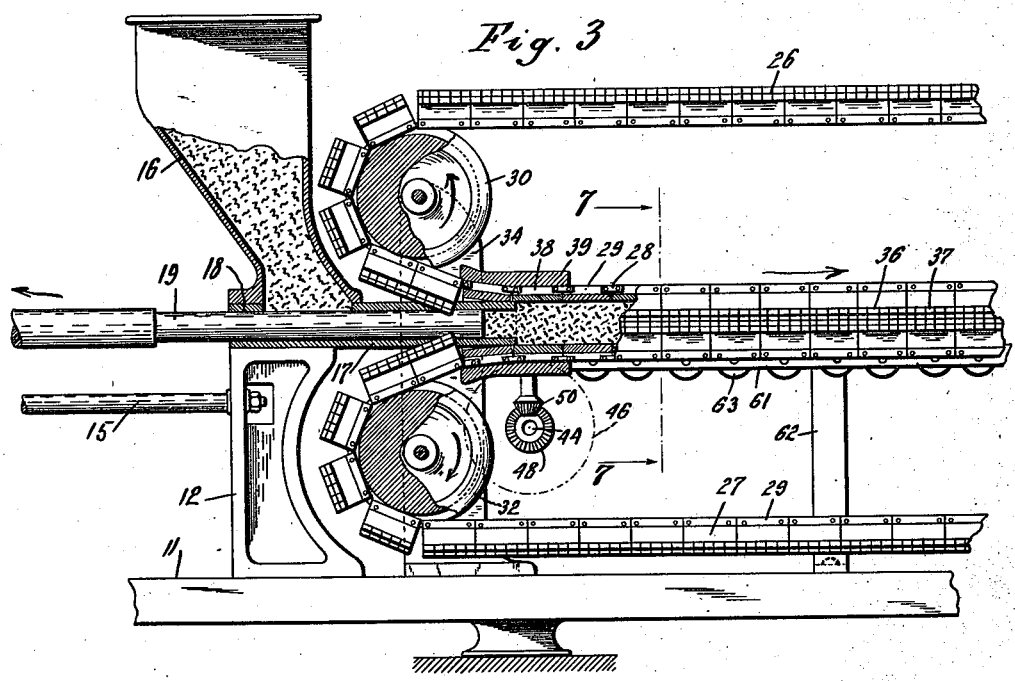
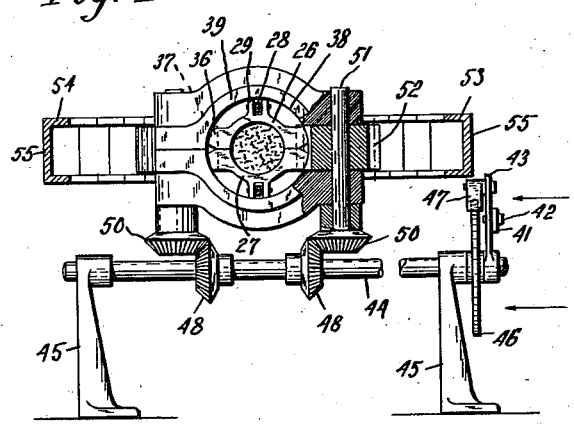
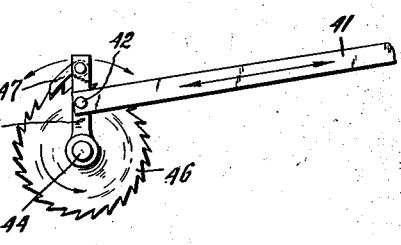
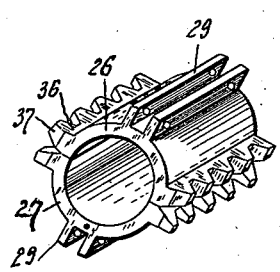
INVENTOR  
A. F. Muller  
BY  
ATTORNEY

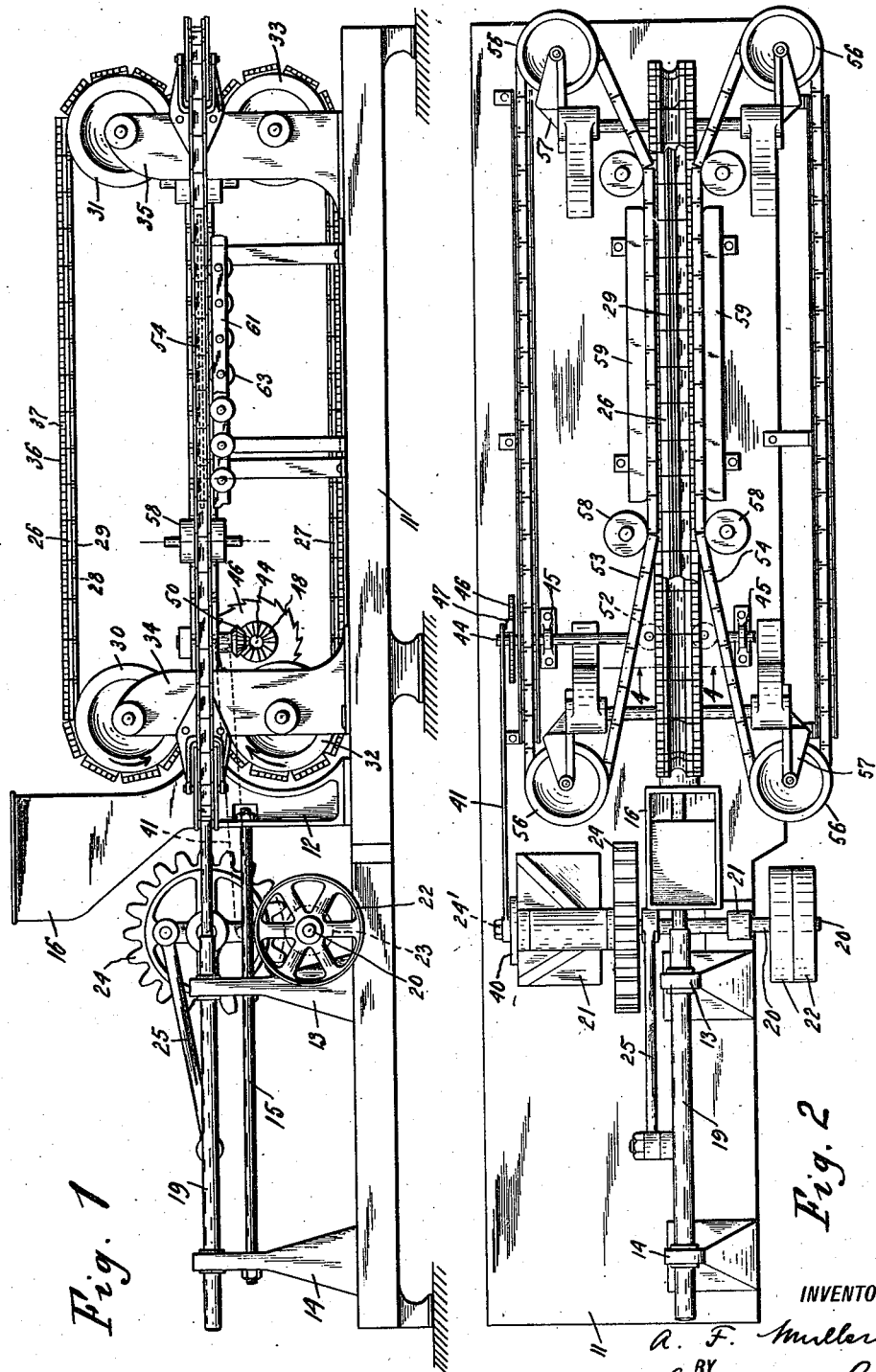

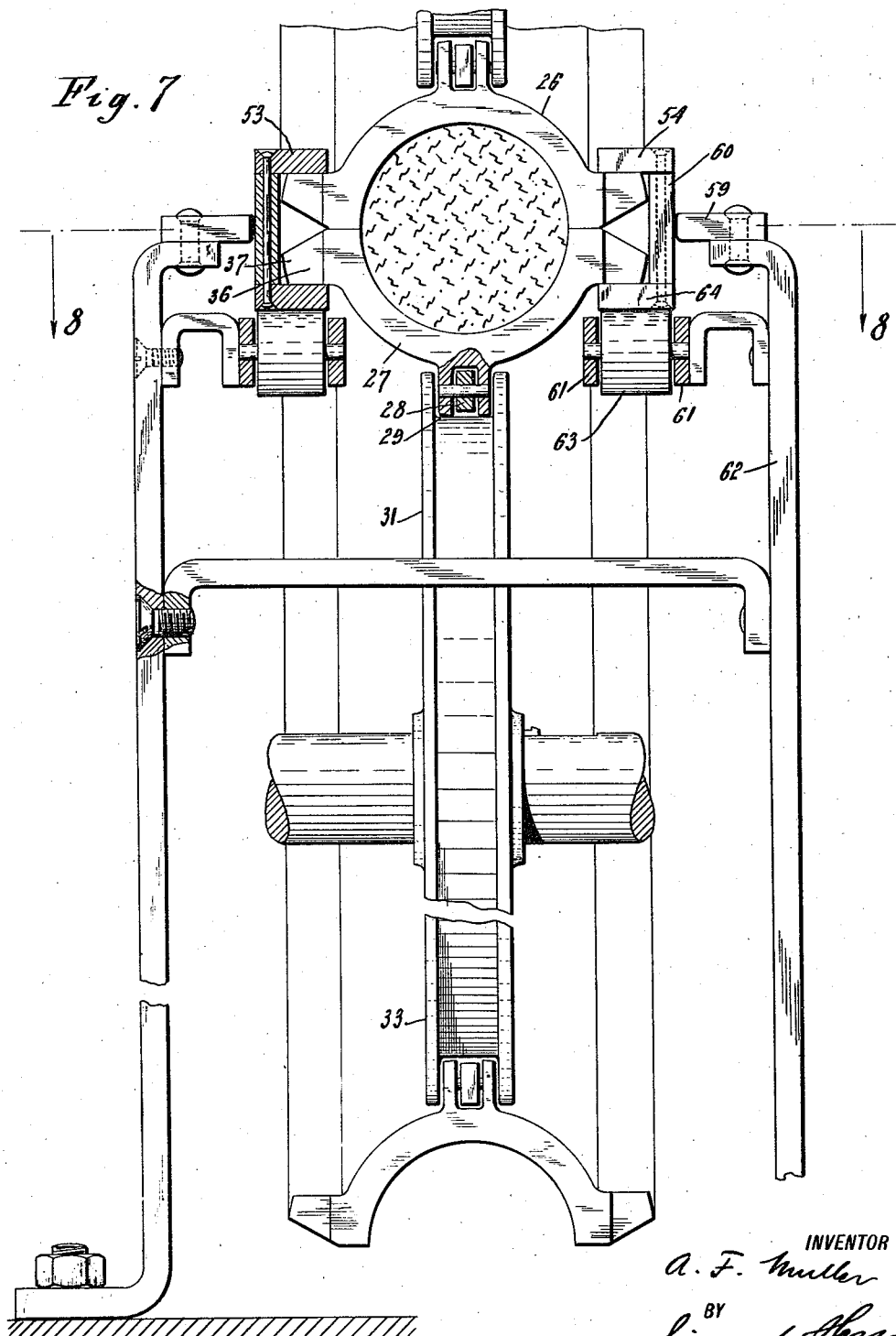

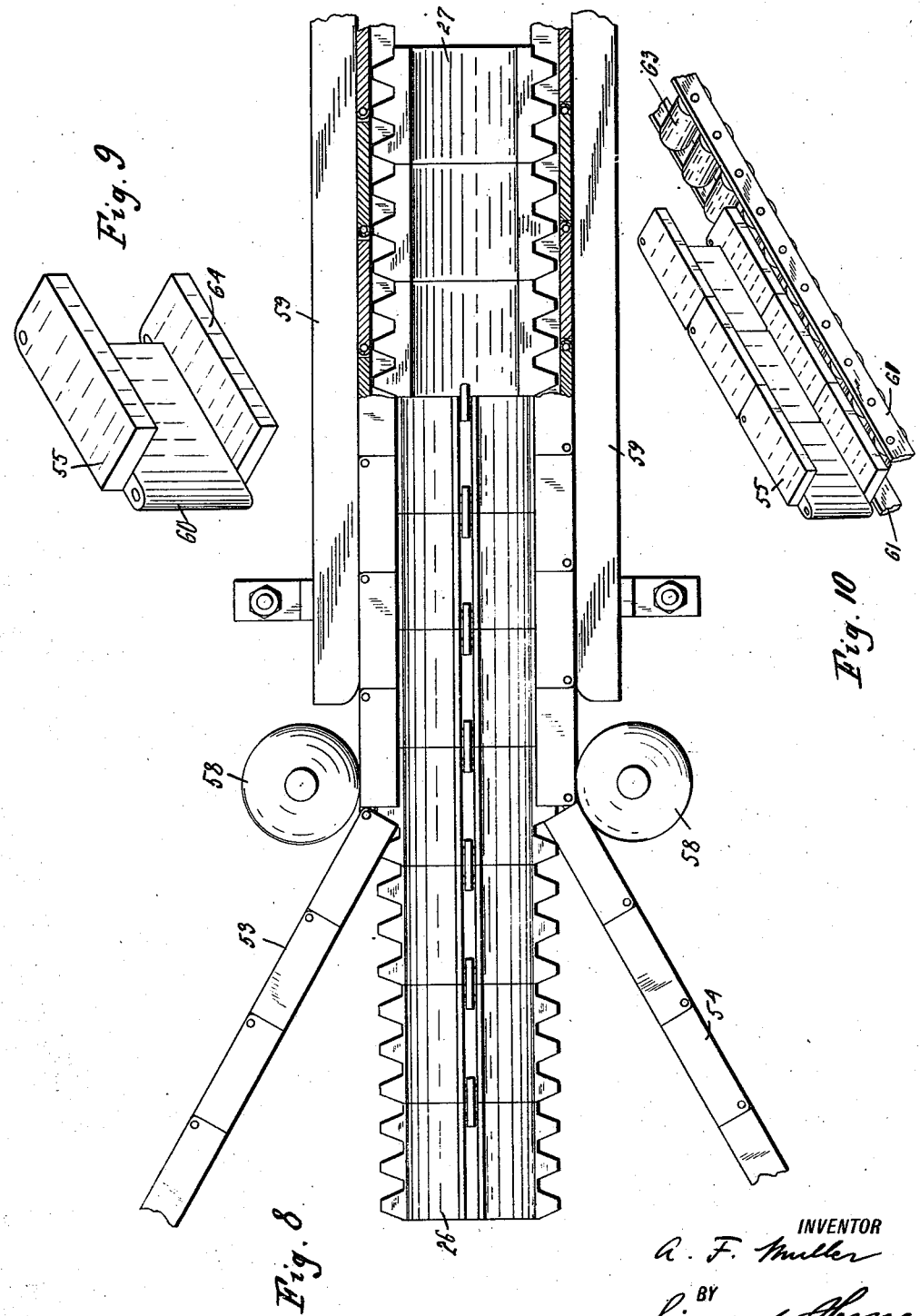

Patented Oct. 12, 1926.

1,603,140

UNITED STATES PATENT OFFICE.

ARTHUR F. MULLER, OF GLENDALE, NEW YORK.

APPARATUS FOR MAKING CORK ARTICLES.

Application filed July 30, 1925. Serial No. 47,160.

The present invention relates to an apparatus for manufacturing articles of comminuted or granulated cork. It pertains more particularly to an apparatus for forming rods especially adapted for use in producing what is known in the trade as composition cork articles, such as, for instance, cork disks or other sealing devices used in the bottling or analogous arts, although such rods may be used for various other purposes.

In forming cork rods of the type mentioned the granulated cork is mixed with a suitable binding agent, which is adapted to coagulate and unite the particles of cork when subjected to a proper degree of heat and pressure, and when cool becomes insoluble and practically unaffected by any degree of heat to which the finished article may be subjected without being destroyed or consumed. The comminuted cork prepared as stated is usually packed into a confining tube or mold, the filled or packed tube being heated in an oven to the desired degree, the rod so obtained being then removed from the mold and severed into sections of the desired length or thickness to form bottle cap sealing disks, gaskets, packing rings, etc.

The invention pertains more particularly to an apparatus of the extrusion type, the comminuted cork, having the binder incorporated therein, being forced into and through a confining tube or mold, wherein it is subjected to heat sufficient to effect coagulation of the binder, the cork particles being added in succeeding increments to the body passing into and through the tube or mold and being advanced by an intermittently acting or reciprocatory plunger, wherein the particles are compressed, to be heated after compression. The apparatus pertains to that type of cork molding devices, in which the tube or mold is made of two sets of moving semi-tubular sections, the members of one set complementing those of the other set to form tube sections, into which the granular material is fed, the arrangement being such that the semi-tubular sections of each set form an endless chain, the members of one set being held in tube-forming complementary positions with the members of the other set to form a tube of considerable length.

The main object of the invention is to provide an apparatus of the type mentioned with a simple and efficient mechanism which holds the tube sections in abutting tube-forming positions, more particularly means which prevent relative movement between the mold sections both in vertical and horizontal planes, for the purpose of obtaining a true cork rod.

With these and other objects in view, which will more fully appear as the nature of the invention is better understood, the same consists in the combination, arrangement and construction of parts hereinafter described, pointed out in the appended claims, and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a side elevation of an apparatus constructed in accordance with the present invention; Fig. 2 is a top plan view thereof; Fig. 3 is a side elevation, partly in section, on a larger scale, of the front portion of the apparatus; Fig. 4 is a section taken on line 4—4 of Fig. 2 on a larger scale; Fig. 5 is a perspective view of two complementary semi-tubular tube sections; Fig. 6 is a side elevation, on a larger scale, of the means for advancing the tube sections of the apparatus; Fig. 7 is a section taken on line 7—7 of Fig. 3, on a larger scale; Fig. 8 is a section taken on line 8—8 of Fig. 7; Fig. 9 is a perspective view of one element of the means for holding the abutting semi-tubular mold sections in tube forming positions; and Fig. 10 is a perspective view of a plurality of said elements in combination with means for preventing sagging thereof.

Referring now to the drawings, the numeral 11 indicates a base, on which are mounted standards 12, 13 and 14, connected by a tie rod 15. On the standard 12 is mounted a hopper 16, into which the properly treated comminuted cork is placed. This hopper is provided with a tubular outlet 17, which extends, preferably, horizontally. In alignment with this outlet is provided in the front wall of the hopper an opening 18. Through this opening and outlet is reciprocated a feeding and compressing mechanism, in the form of a plunger 19, which is suitably guided in its movement by the standards 13 and 14. The apparatus is provided with a main driving shaft 20, suitably journaled in bearings on standards 21. This shaft carries loose and fixed belt pulleys 22. To the shaft 20 is attached a pinion 23, in mesh with a gear 24, the shaft 24' of which is suitably journaled in one of the standards 21. To this gear is eccentrically and pivotally secured one end of a connecting rod 25, the other end of which is pivotally connected with the plunger 19.

The mold is composed of two sets of semi-tubular sections, denoted by the numerals 26 and 27. Each set of these mold sections is connected by links 28, whereby two endless chains are formed. These links are secured to ribs 29 on the tube sections, as clearly shown in Figs. 3 and 4 of the drawings. One of these endless chains travels over pulleys 30 and 31, and the other over pulleys 32 and 33, the shafts of the pulleys 30 and 32 being journaled in standards 34, and the shafts of the pulleys 31 and 33 in standards 35. The two endless chains and the mold sections thereon are so disposed in relation to each other that the sections 26 meet the sections 27 adjacent the hopper outlet and are held in abutting tube-forming relation in alignment with the said outlet for a considerable distance, thereby forming a tubular mold, into which the comminuted material is packed by the plunger 19. The length of the mold is predetermined by the distance between the two pulleys over which each endless chain runs, and this length is so selected that the material is not only properly packed into the mold but also subjected to a temperature that is sufficient to affect the binding agent, as will hereinafter appear. Each mold section is provided with horizontal side fins 36, which are cut to provide teeth 37. These teeth in both sets of fins mesh on both sides of the mold sections, (Fig. 5).

The hopper outlet 17 extends into the bore 38 of a stationary body 39, the said bore being such that it accommodates the mold sections in tube-forming relation, the arrangement being such that, as the said molds move on the pulleys 30 and 32 in the direction of the arrows shown on these two pulleys in the drawings, the mold sections move through the body 39 and are caused to form a molding tube. The inlet side of the bore 38 is flaring to permit the mold sections to be brought together gradually.

The mold sections are driven in any suitable manner, for instance from the shaft 24'. For this purpose there is fixed to the outer end of the last-mentioned shaft a disk 40 to which is eccentrically pivoted a ratchet operating link 41. The other end of this link is pivoted at 42 to a ratchet arm 43, which is oscillatably mounted on a shaft 44.

This shaft is journaled in bearings 45 and has fixed to it a ratchet wheel 46, with which cooperates a pawl 47 on the ratchet arm 43. To the shaft 44 are furthermore keyed two bevel gears 48, in mesh with similar gears 50, the spindles 51 of which are journaled in the body 39. To each spindle is fixed a pinion 52, adapted to mesh with the teeth 37 on the fins 36 of the mold sections. By this mechanism the mold sections are driven at a comparatively low speed and intermittently.

In order to hold the mold sections in abutting tube-forming positions, two endless chains 53 and 54 of confining means are provided. Each of these chains is made up of a series of connected channel links 55, each link being U-shaped in transverse cross-section and of a size to fit the fins 36 of two abutting tube forming mold sections, as clearly appears from Fig. 7 of the drawings. When the mold sections issue from the member 39, their fins are engaged by the two chains 53 and 54, the chains moving with the mold sections and being disengaged therefrom immediately before the said mold sections are separated, that is to say when they reach the pulleys 31 and 33. The chains 53 and 54 run over pulleys 56, journaled in bearings 57, the latter being mounted, for instance, on the standards 34 and 35. In order to force the chains 53 and 54 into engagement with the mold sections, idlers 58 are provided adjacent the member 39. As appears from Fig. 7 of the drawings the channel links 55 prevent separation of the mold sections in a vertical plane. In order to prevent separation of the mold sections in a horizontal plane, the chains 53 and 54 are, when in engagement with the mold sections, prevented from moving horizontally by rails 59, which bear against the vertically disposed webs 60 of the channel links. The chains 53 and 54, owing to their length, are liable to sag, and so is also the mold liable to bend in the middle. In order to prevent this, there are supports provided for the said chains. Each of these supports comprises rails 61 supported by standards 62, the latter also supporting the guide rails 59. On the rails 61 are mounted rollers 63, on which the lower horizontal flanges 64 of the channel links 55 rest.

The operation of this machine is as follows: Charges of the comminuted cork are advanced by the plunger, on its feeding stroke, through the tubular outlet 17 of the hopper into the mold in contact with the previously fed cork. If no cork is in the mold, the desired degree of pressure, etc. may be brought about by plugging the said mold until it is filled, when the plugs are driven out by the accumulated cork. The mold is filled at such a speed that the cork is properly compressed therein, and, as the compressed cork is advanced, the binding agent is coagulated by suitable heating means disposed practically throughout that length of the mold, in which the sections thereof are in abutting tube-forming relation. This heating means has not been shown, as it does not form part of the present invention. When the binding agent is coagulated it becomes insoluble and binds the particles of cork firmly together. No matter how much pressure is applied to the charges of cork by the plunger, and no matter how much these charges have a tendency to expand when in the mold, the sections of the latter cannot move apart in any direction by reason of their being held against movement by the chains 53 and 54 and the guide rails 59 co-operating with said chains.

The extruded rods or columns of cork are severed into sections of the desired length or thickness to form bottle sealing disks, packing disks, gaskets, etc.

It is obvious that, while herein a specific mold has been described, any other may be used without departing from the invention which lies mainly in the provision of means for preventing the sections thereof from separating and sliding on one another while in abutting positions to form a mold.

What I claim is:—

1. In an apparatus for extruding cork, the combination with two sets of semi-tubular mold sections, each mold section being provided with side fins and each set being interconnected to form an endless chain, means for actuating said endless chains to bring said two sets of mold sections into abutting mold-forming relation so as to obtain a continuous mold through which the cork is extruded, and two endless chains of channel links moving with said first-mentioned endless chains and adapted to engage said side fins for preventing relative movement of said two sets of mold sections while in mold forming relation.

2. An apparatus according to claim 1, comprising means co-operating with said channel links for preventing sagging of said two sets of mold sections while in mold-forming relation.

3. In an apparatus for extruding cork, the combination with two sets of semi-tubular mold sections, each set being interconnected to form an endless chain, means for actuating said endless chains to bring said two sets of mold sections into abutting mold-forming relation so as to obtain a continuous mold through which the cork is extruded, and two endless chains of channel links moving with said first mentioned endless chains and adapted to engage the latter for preventing relative movement of said two sets of mold sections while in mold forming relation.

4. In an apparatus for extruding cork, the combination with two sets of mold sections, each set being interconnected to form an endless chain, means for actuating said endless chains to bring said two sets of mold sections into abutting mold-forming relation so as to obtain a continuous mold through which the cork is extruded, and two endless chains of channel links moving with said first mentioned endless chains and adapted to engage the latter for preventing relative movement of said two sets of mold sections while in mold-forming relation both in a transverse direction and at right angles to said transverse direction.

Signed at New York, in the county of Queens and State of New York, this 16th day of July, A. D. 1925.

ARTHUR F. MULLER.